United States Patent [19]

Kondo et al.

[11] Patent Number: 5,218,452
[45] Date of Patent: Jun. 8, 1993

[54] ELECTRONIC STILL-PICTURE CAMERA HAVING FIELD AND FRAME RECORD MODES WITH A FIELD MODE DEFAULT FEATURE

[75] Inventors: Makoto Kondo, Sagamihara; Nobuo Fukushima, Yokohama, both of Japan

[73] Assignee: Canon Kabushiki Kaisha, Tokyo, Japan

[21] Appl. No.: 372,921

[22] Filed: Jun. 29, 1989

[30] Foreign Application Priority Data

Jun. 29, 1988 [JP] Japan .................. 63-163101

[51] Int. Cl.$^5$ .................................. H04N 5/76
[52] U.S. Cl. ....................... 358/342; 358/906; 358/909; 360/35.1
[58] Field of Search ............... 358/335, 342, 906, 909, 358/213.25, 213.26, 310; 360/33.1, 35.1

[56] References Cited

U.S. PATENT DOCUMENTS

| | | | |
|---|---|---|---|
| 4,553,170 | 11/1985 | Aoki et al. | 358/909 X |
| 4,604,668 | 8/1986 | Lemelson | 358/906 X |
| 4,763,204 | 8/1988 | Kinoshita et al. | 358/909 X |
| 4,802,020 | 1/1989 | Miyake et al. | 358/906 X |
| 4,819,059 | 4/1989 | Pape | 358/310 X |
| 4,825,324 | 4/1989 | Miyake et al. | 358/906 X |
| 4,918,538 | 4/1990 | Saito et al. | 358/906 X |
| 4,982,291 | 1/1991 | Kurahashi et al. | 358/906 X |

Primary Examiner—W. R. Young
Attorney, Agent, or Firm—Fitzpatrick, Cella, Harper & Scinto

[57] ABSTRACT

An electronic still-picture camera device having a first setting circuit for selectively setting one of a frame-record mode and a field-record mode, a second setting circuit for selectively setting one of a first continuous photographing mode and a second, higher speed, continuous photographing mode, and a control circuit for selecting the field-record mode regardless of the first setting circuit when the second continuous photographing mode has been selected by said second setting circuit. Preferably, there is also an imaging system operative in one of a mechanical shutter mode and an electronic shutter mode. The control circuit causes the imaging system to be operative in the electronic shutter mode when the second continuous photographing mode has been selected.

16 Claims, 6 Drawing Sheets

| FIG. 2A |
|---------|
| FIG. 2B |

FIG. 2B

ELECTRONIC STILL-PICTURE CAMERA HAVING FIELD AND FRAME RECORD MODES WITH A FIELD MODE DEFAULT FEATURE

BACKGROUND OF THE INVENTION

1. Field of the Invention

This invention relates to an electronic still-picture camera having a frame-record mode, a field-record mode, and a successive (continuous) photographing operation.

2. Description of the Prior Art

A conventional electronic still-picture camera has a frame-record mode in which image signals for two interlaced fields using two concentric tracks are recorded, and a field-record mode in which image signals for one field using only one track are recorded.

In such an electronic still-picture camera, there is a problem that, when the image mode is set in the frame mode, the time for removing unnecessary charges, the exposure time, the recording time and the like are longer than those in the field mode. Therefore, high-speed successive photography can not be performed. That is, while in the frame recording mode, if unnecessary charges of all picture elements for a field by field sequential reading field by field are simultaneously removed, a difference in dark current is produced since read timing of an odd-numbered field is shifted by one field from that of an even-numbered field. In order to reduce this difference, it is necessary to shift the timing for removing unnecessary charges by an amount corresponding to a difference in read time (time for one field), and the time for clearing becomes longer by one field period. Furthermore, reading is performed by adding signals of two lines in the field mode, while read is performed in a unit of one line in the frame mode. Accordingly, the sensitivity of an imaging device in the frame mode becomes ½ of that in the field mode. Hence, exposure time in the frame mode becomes twice that in the field mode. In the frame mode, since crosstalk is generated if it is intended to simultaneously record image signals for two fields on two tracks, sequential recording is desirable. If sequential recording is performed, however, recording time becomes twice that in the field mode. Moreover, in the frame mode, if it is intended to perform sequential recording by shifting heads, there is a need for delay means for delaying the succeeding field signal for the period of time required for the head to shift. Hence, it is desirable to unify two heads. In that case, however, the head shift must be performed by two tracks, and there is the problem that extra time is also required.

The camera is configured such that a field picture is recorded on an SV (still-video) floppy disk (rotating at a constant angular velocity) in synchronization with the rotating phase of the SV floppy disk. Hence, it is not simply better to shorten the time necessary for processes other than recording, because frame speed for successive photographs is not improved unless the time is shortened by 1 V unit (a time for performing one-field recording, that is, a time for one rotation of an SV floppy disk). In the NTSC system (a system of 60 fields/second), for example, since it is realistically impossible to make the necessary time for processes other than recording (for example, track feeding of heads) zero, the maximum realistic frame speed for successive photographs becomes 30 frames/second (1 V for recording, and 1 V for other processes) in the field mode, and 20 frames/second (2 V for recording, and 1 V for other processes) in the frame mode. If it takes more than 1 V for processes other than recording, it becomes impossible to maintain the above-described frame speed (even if the time is 17 msec) (20 frames/second if 1 V for recording and 2 V for other processes in the field mode, and 15 frames/second if 2 V for recording and 2 V for other processes in the frame mode).

Considering the actual state of head-feeding mechanisms, the necessary time for charging a mechanical shutter, and the running time of the screen during exposure, there are required 20 msec–40 msec for moving the head one track, 20 msec–50 msec for charging the mechanical shutter, and 5–15 msec for running the screen during exposure. It is not so difficult to shorten this time itself, but such high speed results in a higher electric-power consumption since all of the above-described processes are accompanied by mechanical movements. Hence, in a portable electronic camera, if these movements are always performed at high speed for the sake of frame speed during high-speed successive photographing operations, the number of usable frames per one set of batteries is usually reduced. Changing the moving speed of these mechanical moving parts during successive photographing operations and during one-frame photographing results in a complex mechanical structure, high cost, and a decrease in reliability.

If the frame speed during successive photographing operations is estimated by these values, it is only possible to photograph 1 V+45 msec–105 msec→4 V–8 V (15 frames/second–7.5 frames/second) for the field mode, and 2 V+65 msec–145 msec→6 V–11 V (10 frames/second–5.5 frames/second) for the frame mode, if all operations are performed time serially. Even if simultaneous operations are executed among these processes (shutter charge, exposure and track feeding), and neglecting an increase in instantaneous current consumption (an increase in current consumption decreases the voltage which can be effectively utilized due to the existence of an internal resistance of a battery, and this fact also results in a decrease in the number of usable frames), it is only possible to photograph 1 V+25 msec–65 msec→3 V–5 V (20 frames/second–12 frames/second) for the field mode, and 2 V+40 msec–80 msec→5 V–7 V (12 frames/second–8.5 frames/second) for the frame mode. These values are fairly slow compared with the maximum desirable frame speeds (calculated values based on realistic assumptions) of 30 frames/second in the field mode, and 20 frames/second in the frame mode.

As described above, it is impossible to perform a high-speed successive photographing operation when the frame mode is set. If photographing has been started without noticing this situation, a shutter opportunity may be missed.

SUMMARY OF THE INVENTION

It is an object of the present invention to solve the above-described disadvantages of the prior art.

It is another object of the present invention to provide an electronic still-picture camera capable of surely performing high-speed successive photographing operations.

In order to achieve such objects, the present invention has made possible high-speed successive photographing operations, without complicated operations or high-speed operation of mechanical operating members, by providing a configuration in which the mode setting is automatically switched to a field-record mode preferable for high-speed successive photographing operations, and further is preferably switched to photographing with an electronic shutter in a high-speed successive photographing mode, even when operating members are set in the high-speed successive photographing mode and the frame-record mode.

In one aspect of the present invention, an electronic still-picture camera apparatus includes a first setting means for selectively setting one of a frame record mode and a field record mode. A second setting means selectively sets one of a first record mode and a second, higher speed, continuous record mode. Control means are provided for selecting the field record mode irrespective of the first setting means when the second continuous record mode has been set by the second setting means.

According to another aspect of the present invention, an electronic still-picture camera has imaging circuitry for converting circuitry for converting an image of an object into an electrical signal. Recording circuitry records the electrical signal, and a first switch sets the recording circuitry to one of a frame record mode and a field record mode. A second switch is used to set the camera to one of a single shot record mode and a successive shots record mode. Control circuitry sets the recording circuitry to the field record mode even when the first switch is set to the frame record mode, when the second switch is set to the successive shots record mode.

According to a further aspect of the present invention, a method of operating an electronic still camera includes the steps of (1) selecting either of a field record mode or a frame record mode, (2) designating either a single shot record mode or a successive shots record mode, (3) generating an electronic still video signal from an image of an object, and (4) storing the electronic still picture signal in accordance with the record modes selected in the selecting and designating steps, except when the successive shots record mode has been designated whereupon the electronic still picture signal is stored in the field record mode even when the frame record mode has been selected.

These and other objects and features of the present invention will become more apparent from the following description and drawings.

DETAILED DESCRIPTION OF THE PREFERRED EMBODIMENTS

Figure 1:
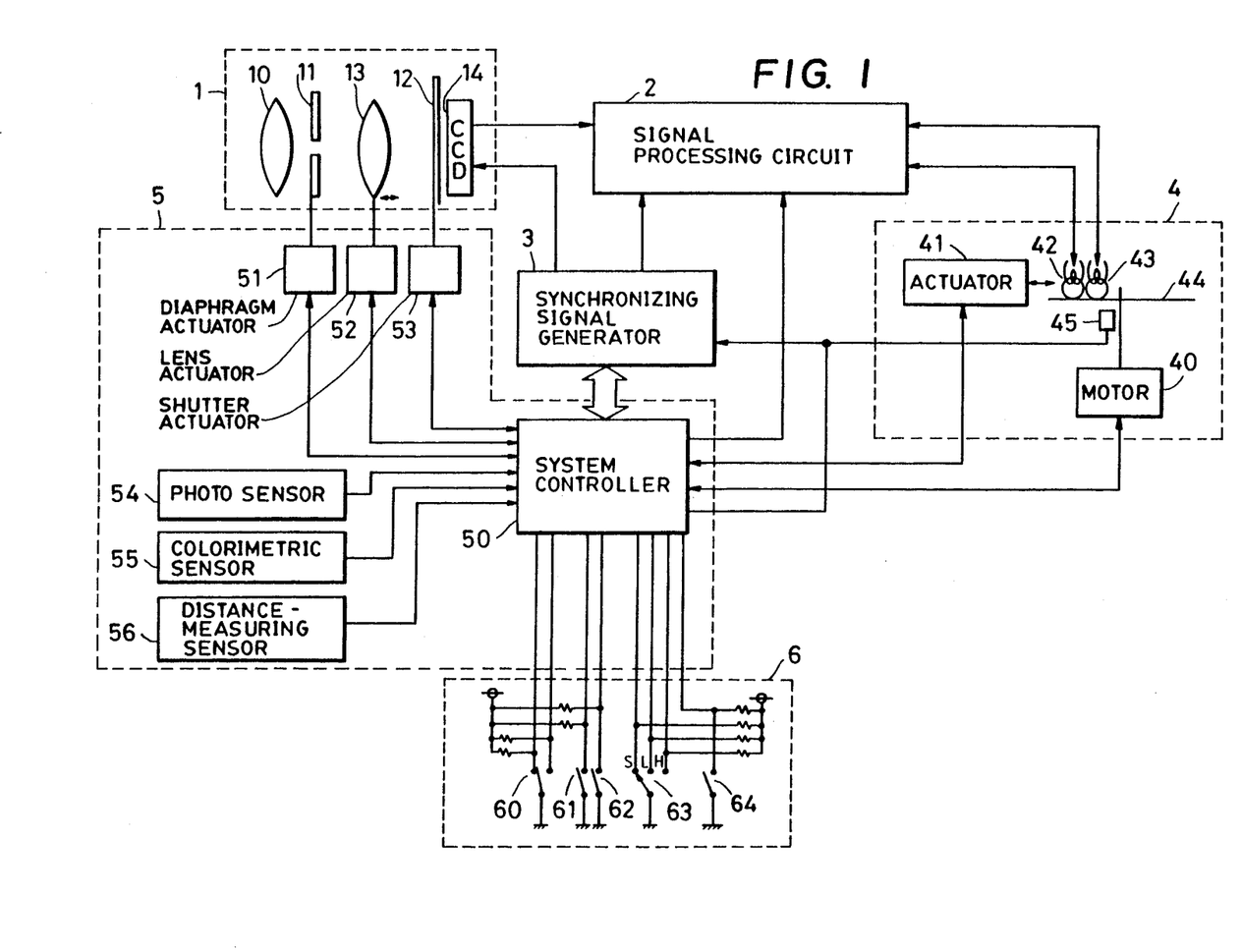
FIG. 1 is a block diagram of an embodiment of the present invention.

FIG. 1 shows an imaging optical system 1, having an imaging lens 10, a diaphragm 11, a shutter 12, a focusing lens 13 and an imaging device represented by a CCD 14 or the like. A signal processing circuit 2 performs compression, amplification, clamping, matrix conversion, modulation, and mixing of signals in order to (1) convert color signals (such as R, G, B and the like, output from the imaging device 14) into Y, R-Y, B-Y signals, (2) perform FM modulation of these signals, and (3) supply the modulated signals to heads 42 and 43 for magnetic recording. A synchronizing signal generator 3 generates (1) driving pulses for removing unnecessary charges from the imaging device 14 and for reading image information, (2) clamp pulses and blanking pulses for image signals, (3) pulses such as carriers and the like for recording various kinds of synchronizing pulses, (4) clock signals etc. and the like. An SV floppy disk drive 4 drives the floppy disk and includes a spindle motor 40 having a constant-speed servo controller and subjected to start and stop control by a system controller 50. An actuator 41 moves recording heads 42 and 43 in the direction of the radius of the floppy disk. The magnetic heads 42 and 43 perform electromagnetic conversion of electric signals processed by the signal processing circuit 2 and record these signals on a floppy disk. The disk drive 4 also includes an SV floppy disk 44 and a rotating-phase detector (termed hereinafter a PG sensor) 45 for detecting the phase of the floppy disk. There is also shown a control system 5 having a system controller 50 comprising a microcomputer or the like, a diaphragm actuator 51, a lens actuator 52, a shutter actuator 53, a photosensor 54 for measuring brightness of an object, a colormetric sensor 55 for measuring color temperature of a light source irradiating the object, and a distance-measuring sensor 56 for measuring a distance from the camera to the object. In a switch group 6 for inputting commands to the system controller 50, there are a changeover switch 60 for switching between a frame mode and a field mode, a switch 61 (abbreviated hereinafter as SW1) operated by a first stroke of a shutter release button (not illustrated), a switch 62 (abbreviated hereinafter as SW2) operated by a second stroke of the shutter release button, and a switch 63 linked with the switching operation of successive photographing modes (single release mode S/low-speed successive photographing mode L/high-speed successive photographing mode H). Switch 64 is used to command either a read mode or a record mode. The mechanical shutter mode performs exposure for the imaging device 14 for a predetermined time by the mechanical shutter 12. The electronic shutter mode changes the substantial accumulation period by variably controlling the time from the clearing operation to the reading operation of a charge signal in the imaging device 14 with keeping the mechanical shutter open. The system controller 50 also acts as a switching means for switching the both modes.

Figure 2:
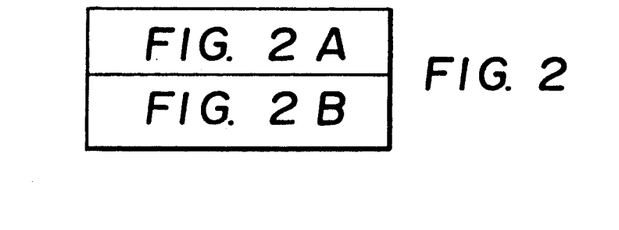
FIGS. 2, 2A, 2B, 3, 3A, 3B, and 3C are flow charts of a system controller of the embodiment of the present invention.
Figure 2A:
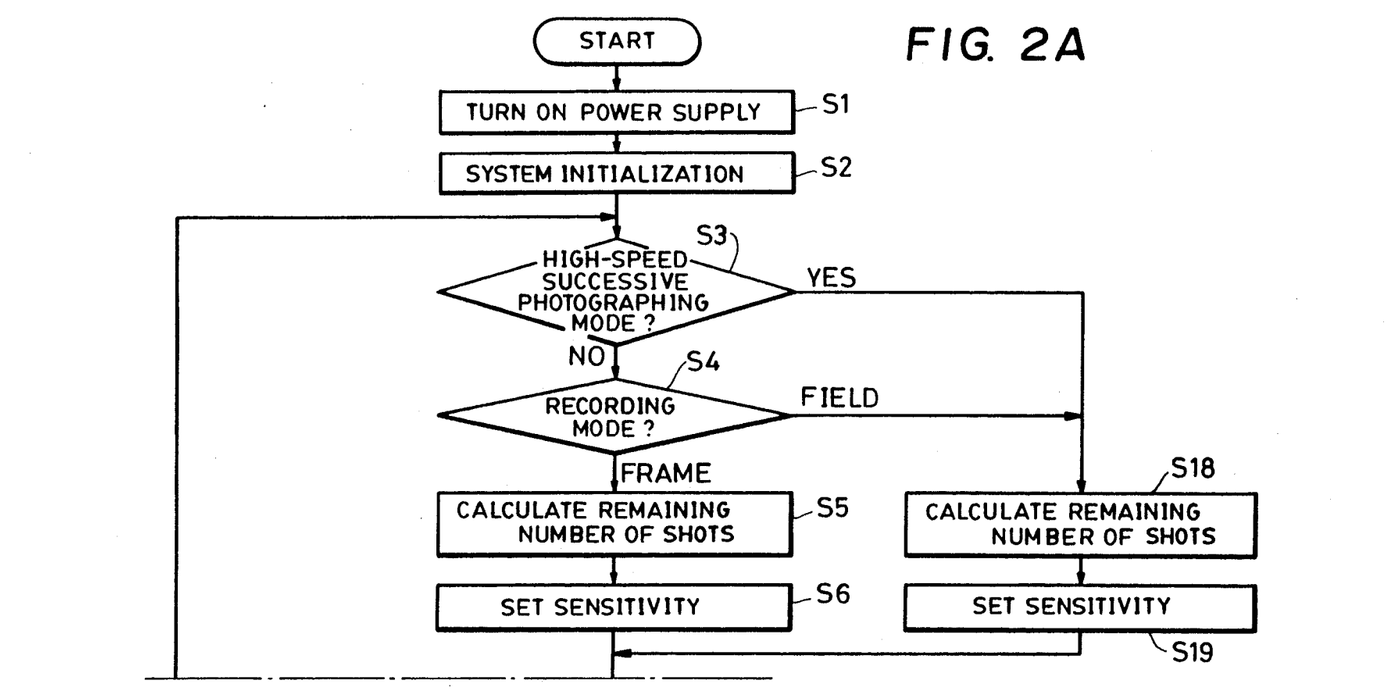
Figure 2B:
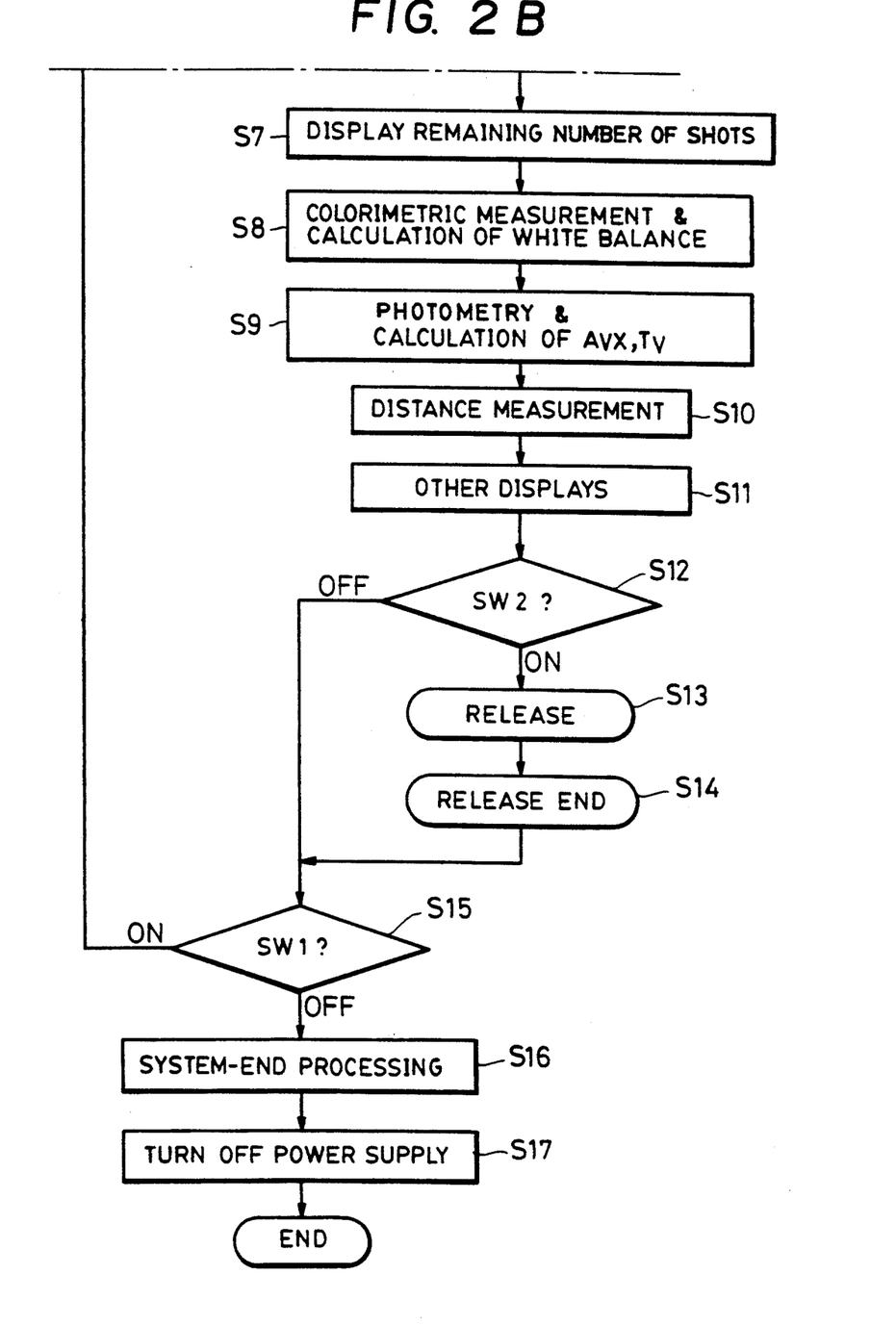
Figures 3, 3A:
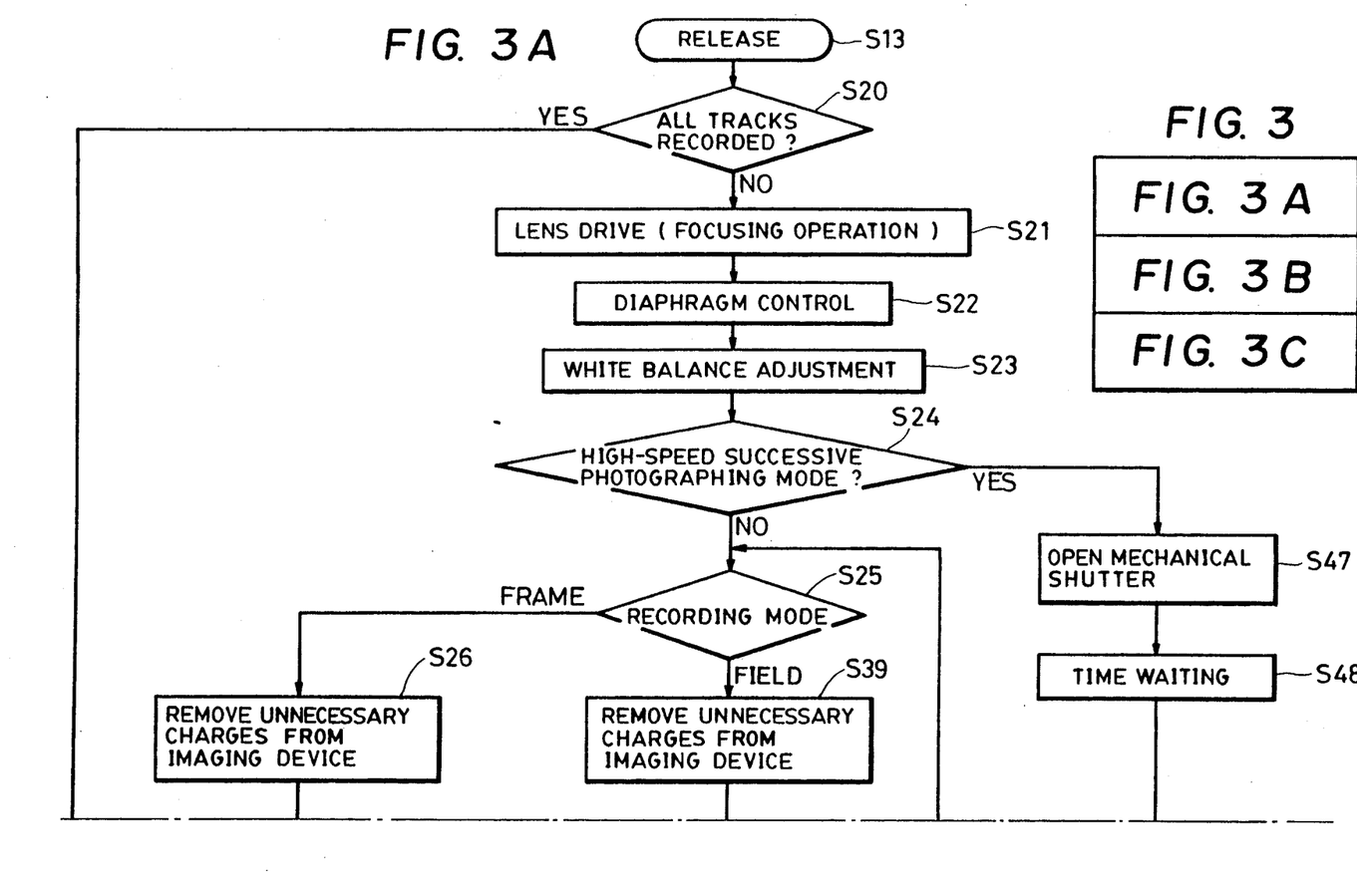
Figure 3B:
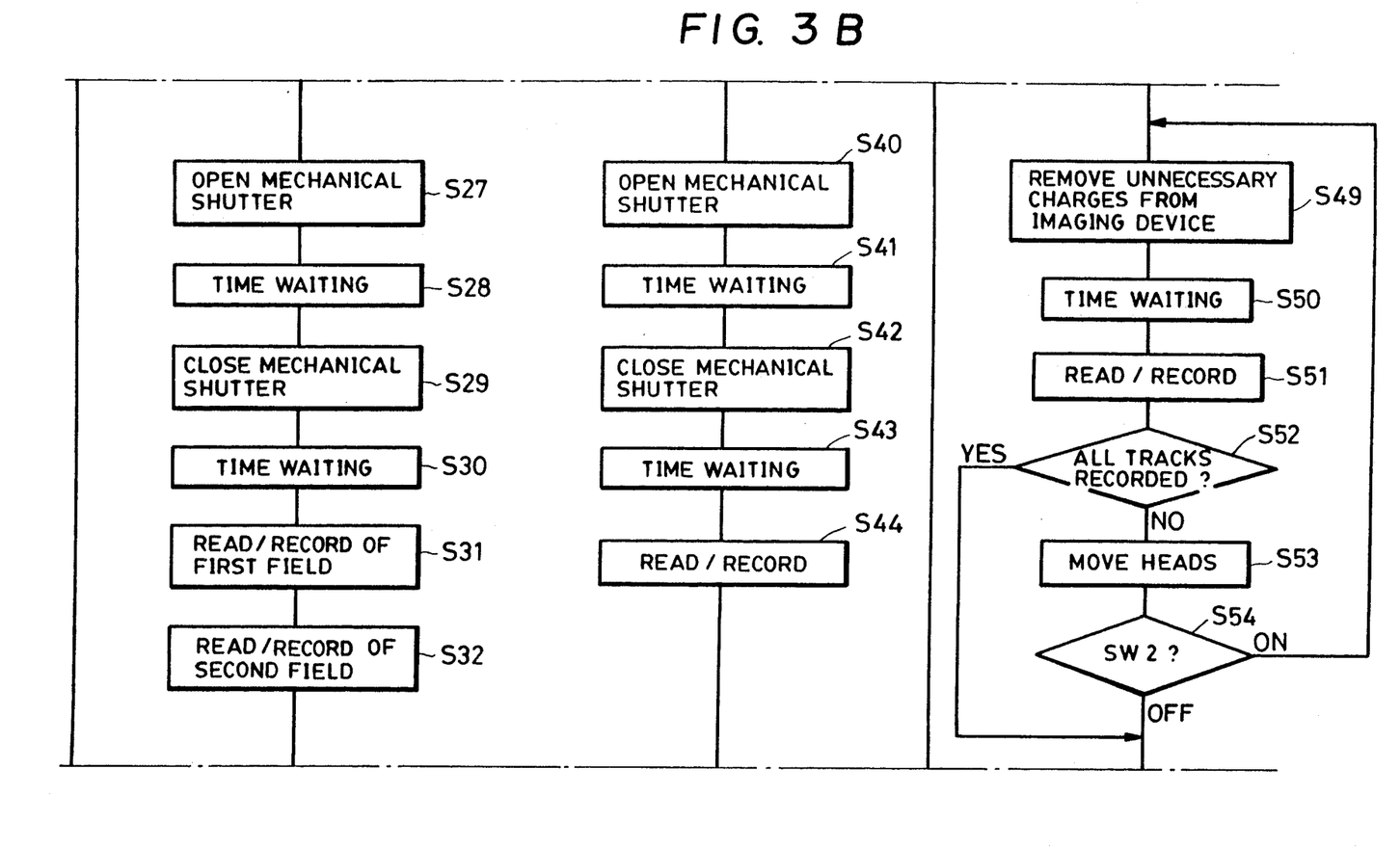
Figure 3C:
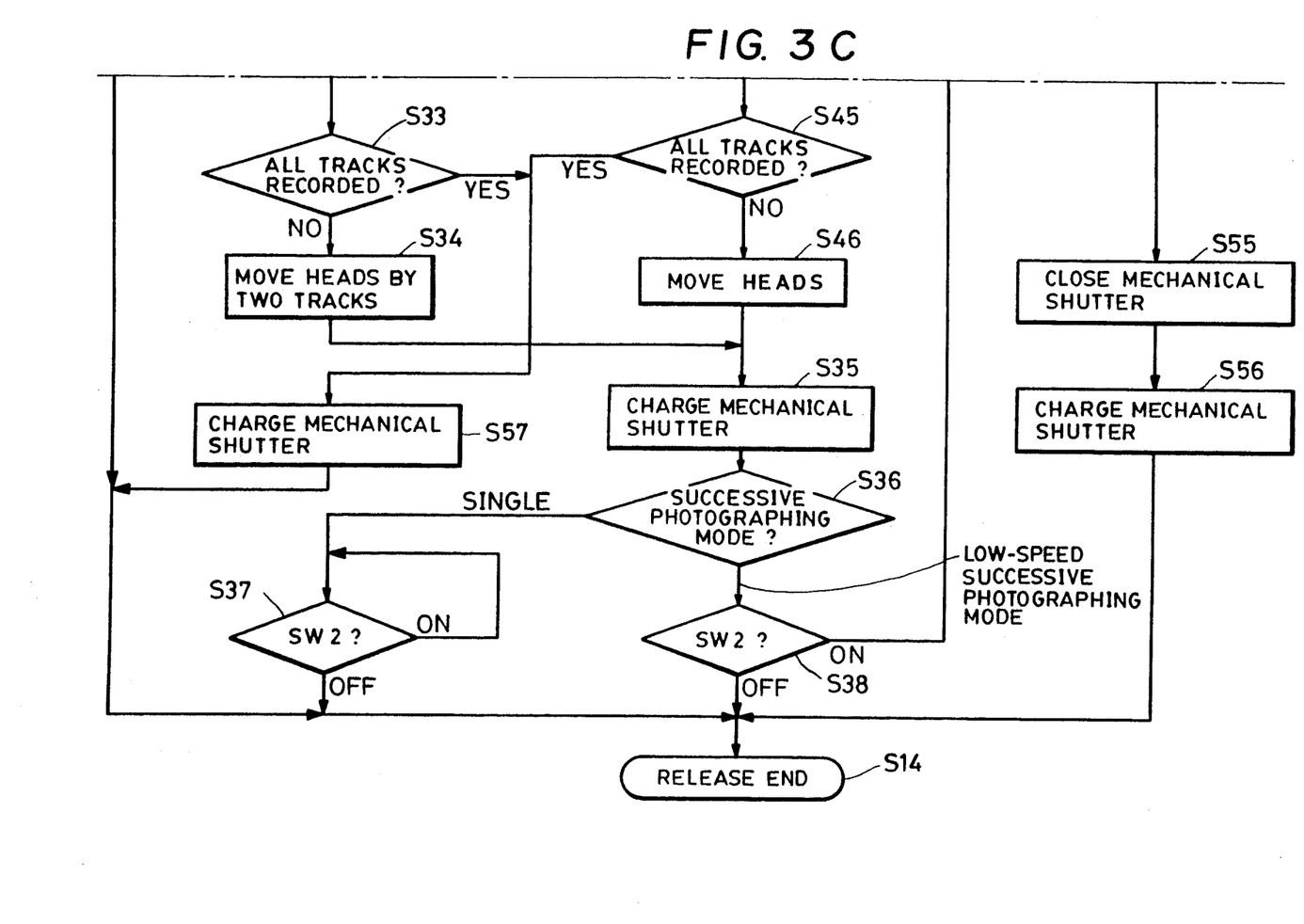

The operation of an electronic still-picture camera having the configuration as described above will now be explained with reference to the flow charts of FIGS. 2 and 3. These flow charts are embodied in programs stored in system controller 50.

First, when SW1 61 is turned on at S1, power is supplied to the entire system, and initialization of the system is performed at S2 (initialization of the system includes (1) initialization of data in registers and memories within the system controller 50, (2) start and rotation of the spindle motor 40, (3) supplying proper pulses and clock pulses to the signal processing circuit 2, and (4) controlling the synchronizing signal generator 3 to place the signal processing circuit 2 in a standby state, and the like). When initialization has been completed, the system changes the content of a display (not shown) according to the state of the switch group 6.

A single photograph operation in the frame mode will be hereinafter described. In this case, the process proceeds to step S5 via steps S3 and S4. Since two tracks are used for one frame, the value of the remaining track numbers held in a rewritable nonvolatile memory (not shown) within the system controller 50 is divided by two (any numerical value after the decimal point is truncated) and the result is the remaining number of shots. The process then proceeds to step S6. Since sensitivity of the imaging device 14 decreases by one step (1 EV) in the frame mode as compared with the field mode, a correction is needed when calculating the values of diaphragm and shutter speed according to the brightness of the object. Data for this purpose are held within the system controller 50 as the sensitivity of the imaging device. Subsequently, the remaining number of shots calculated at S5 is displayed at S7, data from the colorimetric sensor 55 are read at S8 to perform a calculation for white balance correction, and, at S9, the value $A_v$ of the diaphragm and the value $T_v$ of the shutter speed for providing a proper exposure are then calculated using data of the photosensor 54 and the value of sensitivity of the imaging device 14 held within the system controller 50. At S10, the distance to the object is measured using the distance-measuring sensor 56, and the distance value is converted into corresponding position data for positioning the focusing lens 13. These data (the corrected value of the white balance, the values of the diaphragm and shutter speed time, and the proper position of the focusing lens) are held until they are measured again, or the SW1 61 is turned off and the power supply is cut off. When these measurements and operations have been completed, the results (for example, the values of the diaphragm and shutter speed) or alarms based on the results (for example, low brightness, alarm for arm trembling or failure of distance measurement) are displayed at S11.

After these preliminary actions, it is determined whether or not SW2 62 is turned on at S12. If turned on, the process proceeds to a release routine at S13 (FIG. 3), and then proceeds to S14 and then S15 after completing S13. If SW2 62 is not turned on at S12, the SW1 61 is immediately checked at S15. If SW1 61 is turned on, the above-described processes of measurement, operation and display, such as photometry, distance measurement and the like, are repeated. If SW1 61 is turned off at S15, a system-end routine of stopping the spindle motor 40, writing the remaining track number in the rewritable nonvolatile memory and the like is performed at S16, and the power supply is then turned off at S17.

Next, an explanation will be provided for a single photograph operation in the field mode. However, only the portion which is different from the above-described case of the single photograph operation in the frame mode will be described. In this case, the process proceeds to S18 via S1, S2, S3 and S4. Since one track is used for one frame, the remaining track number held in the rewritable nonvolatile memory within the system controller 50 is set as the remaining number of shots. At S19, the sensitivity of the imaging device 14 is also set to data corresponding to the field mode, that is, data twice the sensitivity of the frame mode. Relative to the display, measurement and other processes after S19, a processes identical to those in the above-described case of the single photographing operation in the frame mode are performed.

Also in the low-speed successive photographing mode, the processes before SW2 62 is turned on are identical to those in the case of the single photographing operation (frame mode/field mode).

In the high-speed successive photographing mode, after initialization of the system of S2, the process proceeds to S18 and S19 irrespective of the setting of the frame/field mode, and the remaining track number and the setting of sensitivity are determined as in the field mode. Subsequently, processes identical to those in other modes are performed until SW2 62 is turned on.

Next, the shutter release operation after SW2 62 is turned on will be explained with reference to FIG. 3.

When SW2 62 is turned on at S12, it is determined whether or not the remaining track number is 0 at S20. If not, the process proceeds to S21, where the lens actuator 52 is driven according to the position data, the value of the diaphragm of the focusing lens, and the corrected value of the white balance (which have been measured and calculated when only SW1 61 was turned on). The diaphragm actuator 51 is driven at S22, and white balance is controlled by the signal processing circuit 2 at S23. Since the processes are different for successive photographing operations in the field and frame modes respectively, an explanation will be separately provided for each case.

(a) The single or low-speed successive photographing operation in the frame mode:

The process proceeds to S26 via S24 and S25. At S26, the system controller 50 first controls the synchronizing signal generator 3 to remove unnecessary charges from the imaging device 14. If the time from this removing operation to the read operation is different for the first and second fields by one field, there is a difference in the average level of thermoelectrons and a difference occurs in the black level. Hence, removing of unnecessary charges from the second field is delayed by 1 V from the removal of unnecessary charges from the first field. When the removal has been completed, the mechanical shutter 12 is opened at S27, and after a time interval S28 of the shutter speed time $T_v$ calculated at S9, the mechanical shutter 12 is closed at S29.

After starting the closing of the mechanical shutter 12, step S30 waits for a time sufficient for the mechanical shutter 12 to be completely closed. At S31, reading and writing of image information of the first field of the imaging device 14 are performed by controlling the synchronizing signal generator 3 and the signal processing circuit 2. When set in the frame mode, the head 42 is used for read/record of the first field of the imaging device 14 at S31, and the head 43 is used for read/record of the second field of the imaging device 14 at S32.

If the camera is configured so that switching and start and stop of the read/record operation of the heads (i.e., start recording of a first field by a first PG output, switching of the heads, and then start recording of the second field signal by a second PG output, and finally completion of recording by a third PG output) are executed in synchronization with an output of the PG sensor 45, it is possible to execute the read/record of the second field from the read/record of the first field without the system controller 50 by setting the synchronizing signal generator 3 as described above after the completion of closing of the mechanical shutter 12. It is then determined whether or not all tracks have been recorded at S33. If it is determined that all tracks on the floppy disk 44 have been recorded, the mechanical shutter 12 is also charged at S57, and the process then proceeds to S14. If all tracks have not been recorded, the process proceeds to S34, where the system controller 50 moves the heads 42 and 43 two tracks toward the inner tracks by controlling the head actuator 41, and the mechanical shutter 12 is then charged for the subsequent photographing operations. After charging of the shutter at S35, if it is determined that the mode is the single mode at S36, the subsequent processes are not performed until SW2 62 is turned off at S37. That is, the process does not proceed to S14 unless the shutter release button (not illustrated) is released. On the other hand, when it is determined that the mode is the low-speed successive photographing mode at S36, the process returns to S25 to execute subsequent processes of exposure and read/record if SW2 62 is kept turned on at S38. These operations are repeated until SW2 62 is turned off at S38. If SW2 62 is turned off at S38, the process proceeds to S14.

(b) The single or low-speed successive photographing operation in the field mode:

The process proceeds from S25 to S39, where the system controller 50 causes unnecessary charges to be removed from all picture elements in the imaging device 14 at one moment. The mechanical shutter 12 is then opened at S40. The calculated shutter speed time is timed out at S41, and the mechanical shutter 12 is then closed at S42. After waiting for the running time of the mechanical shutter 12 at S43, reading/recording of image information for one field is performed adding one by one a pair of an odd-numbered line and an even-numbered line of the imaging device by controlling the synchronizing signal generator 3 and the signal processing circuit 2, at S44. The synchronizing signal generator 3 is configured so that, while set at the field mode, it reads signals from the imaging device, processes those signals, modulates them and then records them in synchronization with detected signals of the PG sensor 45, after having been instructed to read/record by the system controller 50 at S44 (start recording at a first PG output, and stop recording at a second PG output). Subsequently, if all tracks have not been recorded at S45, the heads are moved at S46, and the mechanical shutter 12 is charged at S35. If all tracks have been recorded at S45, the process proceeds to S57 and then to S14. Since determination for the subsequent release after S35 is identical to that in the frame mode, an explanation thereof will be omitted.

(c) The high-speed successive photographing mode:

After performing the focusing operation, the diaphragm control, and the correction operation of the white balance at S21-S23, the system controller 50 opens the mechanical shutter 12 at S47, if it is determined that the mode is at the high-speed successive photographing mode at S24 regardless of the setting of the field/frame mode. After waiting a time not less than the time required for opening the mechanical shutter 12 at S48, the system controller 50 performs the operation of removing unnecessary charges from the imaging device 14 at S49. After unnecessary charges are removed, the system controller 50 sets the synchronizing signal generator 3 to the field read/record mode. The PG signal is generated every 1 V (16.7 msec). Hence, by performing the removing of unnecessary charges at a time delayed by $T_o=[16.7$ msec-(the shutter speed time calculated at S9)] from the PG signal preceding that for start recording, a necessary speed time for the electronic shutter can be obtained. At this time, in order to shorten the time from the turning on SW2 62 to the start of exposure of the first frame, monitoring of PG signals may be started before the completion of shutter opening. If time has not lapsed by $T_o$ from the immediately preceding PG signal at the completion of shutter opening, the operation of removing unnecessary charges may be performed when $T_o$ has lapsed from the above-described immediately preceding PG signal without waiting for the next PG signal at S49, and recording may be started at the next PG signal. When time has lapsed by $T_o$ from the immediately preceding PG signal when the shutter opening has been completed, removal of unnecessary charges at S49 is performed after a time lapse of $T_o$ from the next PG signal, and recording is started at the next PG signal.

Thus, the time from the removal of unnecessary charges at S49 until the read/record operation begins becomes the shutter speed time of the electronic shutter. Consequently, after a time interval equivalent to the shutter speed time, the read/record operation is performed at S51. Whether or not all tracks have been recorded is checked at S52, and the heads are moved at S53. Since these operations are identical to those in the low-speed successive photographing mode, an explanation thereof will be omitted. After the completion of these processes, if SW2 is still turned on, the process returns to S49. Also at this time, as in the case of the first frame, if time has not lapsed by $T_o$ from the PG signal immediately before the completion of track feeding, unnecessary charges are removed when time has lapsed by $T_o$ from the immediately preceding PG signal without awaiting the next PG signal, and recording at the next PG signal is performed, thus, realizing a higher speed.

These operations are repeated until it is determined that all tracks on the SV floppy disk have been recorded at S52, or SW2 62 has been turned off at S54. At the time point when it is determined that SW2 62 has been turned off, or all tracks on the floppy disk have been recorded, the mechanical shutter 12 is closed at S55. The mechanical shutter 12 is then charged at S56 for the next release, and the process then proceeds to S14, where release processing is completed.

As described above, according to the present invention, 1) it is possible to perform high-speed successive photographing even in a camera system which only has a low-speed mechanism, and 2) setting of a successive photographing mode becomes easy.

That is, relative to item 1), in the prior art, since the speed of the mechanical parts basically limits the frame speed of successive photographs, only a non-high-speed successive photographing can be obtained, in a camera system which has only a power supply having a small instantaneous current supply capacity, and especially at the frame mode (for example, 5.5 frames/second in the slowest system in the above-described example). Suppose that successive photographing at this speed is termed a low-speed successive photographing mode. In contrast, in the present embodiment, (1 V+40 msec→4 V→) 15 frames/second can be obtained using an identical mechanism.

Relative to item 2), high-speed successive photographing becomes impossible if the mode is set at the high-speed successive photographing mode when the frame mode has been selected. Hence, in such a case, in an electronic still-picture camera system which inhibits shutter release, there occurs a possibility of missing a shutter opportunity. On the contrary, in the present invention, a necessary operation mode can be obtained by a simple operation (only setting the high-speed successive photographing mode irrespective of the setting of the field/frame mode) when the high-speed successive photographing mode is required.

The individual components shown in outline or designated by blocks in the Drawings are all well known in the electronic camera art and their specific construction and operation is not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Electronic still-picture camera apparatus comprising:
   (a) imaging means for converting incident light from an object into an electrical signal;
   (b) recording means for recording said electrical signal on a recording medium;
   (c) first setting means for selectively setting one of a frame-record mode and a field-record mode;
   (d) second setting means for selectively setting one of a first record mode and a second, higher speed, continuous record mode; and
   (e) control means for selecting the field-record mode irrespective of a setting state of the first setting means when the second, continuous record mode has been set by the second setting means.

2. Apparatus according to claim 1, wherein said imaging means is operative in one of a mechanical shutter mode and an electronic shutter mode, and further comprising:
   switching means for causing said imaging means to operate in either the mechanical shutter mode or the electronic shutter mode, said switching means causing said imaging means to be operative in the electronic shutter mode when the second, continuous record mode has been set by said second setting means.

3. Apparatus according to claim 2, further comprising a mechanical shutter, and wherein said switching means causes said mechanical shutter to be in an open state when said imaging means is operative in the electronic shutter mode.

4. Apparatus according to claim 3, wherein said control means causes a signal to be cleared from said imaging means, and wherein, when said imaging means is operative in the electronic shutter mode and after the signal has been cleared from said imaging means, said switching means sets a period of time until a signal is subsequently read from the imaging means.

5. Apparatus according to claim 1, wherein said recording means records signals of plural fields in respective different areas of said recording medium when said first setting means sets the frame-record mode.

6. Apparatus according to claim 5, wherein said recording medium comprises a rotating disk.

7. Apparatus according to claim 6, wherein said recording means records signals field by field in a concentric area on said rotating disk.

8. An electronic still camera, comprising:
   imaging circuitry for converting an image of an object into an electrical signal;
   recording circuitry for recording said electrical signal;
   a first switch for setting said imaging and recording circuitry to one of a frame record mode and a field record mode;
   a second switch for setting said imaging and recording circuitry to one of a single shot record mode and a successive shots record mode; and
   control circuitry capable of setting said imaging and recording circuitry to the field record mode even when said first switch is set to the frame record mode, when said second switch is set to the successive shots record mode.

9. A camera according to claim 8, wherein said control circuitry causes imaging circuitry to be operative in one of a mechanical shutter mode and an electronic shutter mode, and wherein said control circuitry causes said imaging circuitry to be operative in the electronic shutter mode when said second switch is set to the successive shots record mode.

10. A camera according to claim 8, further comprising a recording medium for storing the electrical signal output by said imaging circuitry.

11. A camera according to claim 10, wherein said control means calculates a number of remaining shots capable of being stored on said recording medium, after said first and second switches have been set.

12. An electronic still camera, comprising:
    imaging circuitry for converting an image of an object into an electrical signal;
    recording circuitry for recording said electrical signal;
    a first switch for setting said imaging and recording circuitry to one of a frame record mode and a field record mode;
    a second switch for setting said imaging and recording circuitry to one of a single shot record mode, a low speed successive shots record mode, and a high speed successive shots record mode; and
    control circuitry capable of setting said imaging and recording circuitry to the field record mode even when said first switch is set to the frame record mode, only when said second switch is set to the high speed successive shots record mode.

13. A method of operating an electronic still camera, comprising the steps of:
    selecting either a field record mode or a frame record mode;
    designating either a single shot record mode or a successive shots record mode;
    generating an electronic still picture signal from an image of an object; and
    storing the electronic still picture signal in accordance with the record modes selected in the selecting and designating steps, except when the successive shots record mode has been designated whereupon the electronic still picture signal is stored in the field record mode even when the frame record mode has been selected.

14. A method according to claim 13, wherein the step of generating includes the step of generating the still picture signal in one of a mechanical shutter mode and an electronic shutter mode, and wherein the still picture signal is generated in the electronic shutter mode when said successive shots mode has been designated.

15. A method according to claim 14, further comprising the steps of, when the still picture signal is generated in the electronic shutter mode:

clearing a signal from an imaging device; and
setting a period of time until a subsequent signal is cleared from the imaging device.

16. A method of operating an electronic still camera, comprising the steps of:

selecting either a field record mode or a frame record mode;

designating one of (a) a single shot record mode, (b) a low speed successive shots record mode, and (c) a high speed successive shot record mode;

generating an electronic still picture signal from an image of an object; and storing the electronic still picture signal in accordance with the record modes selected in the selecting and designating steps, except storing the still picture signal in the field record mode even if said frame record mode has been selected, only when the high speed successive shots record mode has been designated.

* * * * *

UNITED STATES PATENT AND TRADEMARK OFFICE
CERTIFICATE OF CORRECTION

PATENT NO. : 5,218,452
DATED : June 8, 1993
INVENTOR(S) : MAKOTO KONDO, ET AL.

It is certified that error appears in the above-indentified patent and that said Letters Patent is hereby corrected as shown below:

COLUMN 1
    Line 26, "field by field" should be deleted.
    Line 35, "read" should read --reading--.

COLUMN 5
    Line 59, "a" should be deleted.

COLUMN 8
    Line 27, "thus," should read --thus--.

COLUMN 11
    Line 10, "shot" should read --shots--.

Signed and Sealed this

Twenty-second Day of March, 1994

*Attest:*

BRUCE LEHMAN

*Attesting Officer*     *Commissioner of Patents and Trademarks*